United States Patent [19]

Aondetto

[11] 4,312,491
[45] Jan. 26, 1982

[54] DEVICE FOR THE RESILIENT SUSPENSION OF VEHICLE SEATS

[75] Inventor: Bernard Aondetto, Nogent sur Marne, France

[73] Assignee: Sable Freres International, Pantin, France

[21] Appl. No.: 114,843

[22] Filed: Jan. 24, 1980

[30] Foreign Application Priority Data

Feb. 2, 1979 [FR] France ................................ 79 02715

[51] Int. Cl.³ ......................... F16M 13/00; B60N 1/02
[52] U.S. Cl. .................................... 248/575; 248/421; 248/588
[58] Field of Search ............... 248/575, 578, 421, 543, 248/588, 573; 297/345

[56] References Cited

U.S. PATENT DOCUMENTS

| | | | |
|---|---|---|---|
| 3,599,232 | 8/1971 | Tabor | 248/575 |
| 3,743,230 | 7/1973 | Freedman | 248/543 |
| 4,029,283 | 6/1977 | Swenson et al. | 248/575 |
| 4,072,287 | 2/1978 | Swenson et al. | 248/421 |
| 4,195,883 | 4/1980 | Ronnhult et al. | 248/588 |

Primary Examiner—Francis K. Zugel
Attorney, Agent, or Firm—Toren, McGeady and Stanger

[57] ABSTRACT

The device comprises a stationary bottom frame, a vertically movable top frame urged upwards by a compression spring, and scissors-type guiding levers between the top and bottom frames. One end of the spring is applied against the guiding levers and the other end is applied against a screw-and-nut system for adjusting flexibility of the suspension according to the weight of the user. A screw or a toothed rack are provided for adjusting the useful vertical range of travel of the suspension according to the height of the user.

7 Claims, 6 Drawing Figures

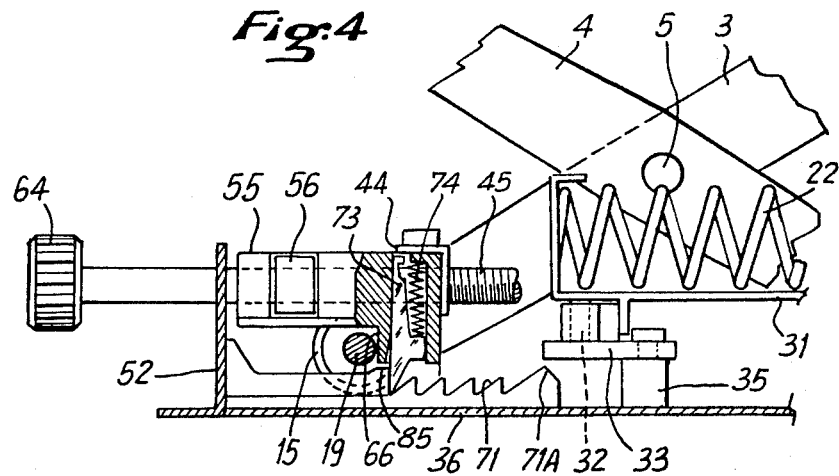
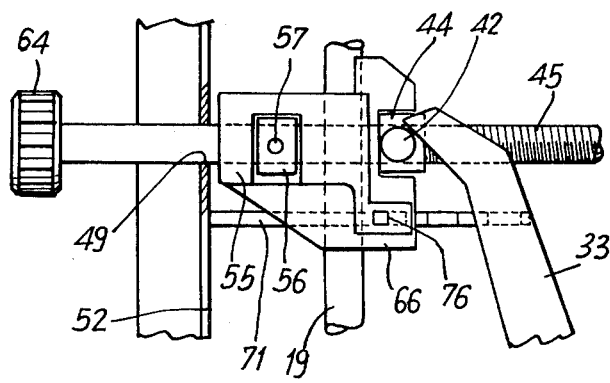
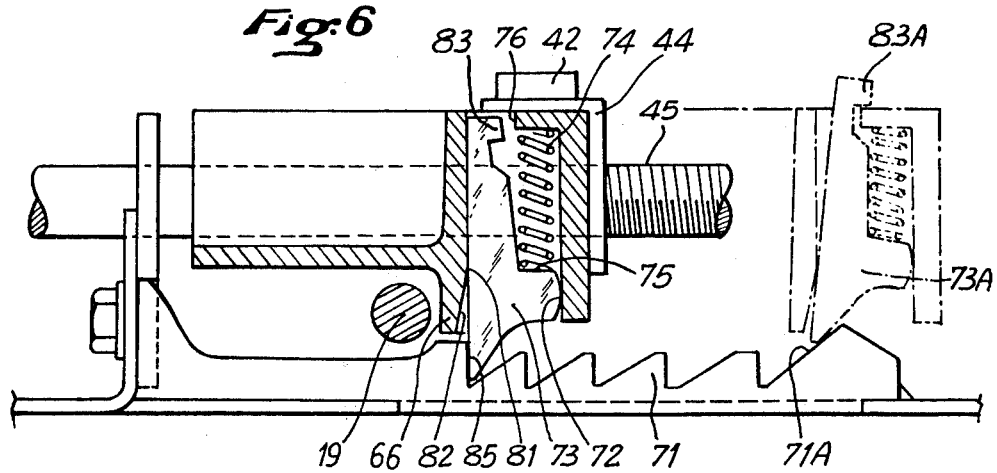

DEVICE FOR THE RESILIENT SUSPENSION OF VEHICLE SEATS

This invention relates to devices for the resilient suspension of vehicle seats, of the type comprising a bottom frame to be mounted on the vehicle, a top frame on which the seat is to be mounted and means for guiding the vertical displacements of the top frame with respect to the bottom frame. Said guiding means are constituted by levers of the scissors type which are pivotally attached at one end respectively to the bottom frame and to the top frame whilst the other ends are so arranged as to slide respectively in a horizontal guide of each frame. The top frame is urged upwards by resilient means which are applied against the bottom frame and attached to the top frame, the flexibility of said resilient means being adjustable in order to adapt them to the weight of the user. Height adjustment means are provided for ensuring vertical location of the useful travel of the suspension which is adapted to the height of the user.

The aim of the invention is to provide a suspension device of the type aforesaid in which the means for adjusting the flexibility of the resilient means and the means for adjusting the height of the seal produce no reaction on each other. In other words, a modification of either of these two adjustments does not produce any change in the other adjustment. Furthermore, these means consist of very simple mechanisms which do not have the effect of increasing the small overall height of the advantageous system for guiding the seat support frames by means of scissors levers.

To this end and in accordance with the invention, the means for adjusting the flexibility of the resilient means and the height-adjustment means are constituted by two horizontal systems mechanically associated in series, the height adjustment means being applied against the bottom frame whilst the flexibility adjustment means are applied against the height adjustment means. One end of the resilient means is applied against an adjusting reduction-lever which is subjected to the flexibility adjustment means whilst the other end of said resilient means is applied against the crank-pin of a crank-arm, this latter being coupled to the lower ends of the guiding arms which are pivotally mounted on the bottom frame. The height adjustment means also actuate a stop for determining the top level of the useful travel of the suspension in cooperation with the lower ends of the guiding levers which are slidably mounted on the bottom frame. The length of the crank-arm as well as the mechanical advantage or reduction ratio of the adjusting reduction-lever are such that the two ends of the resilient means undergo a displacement in the same direction and to the same extent in respect of a movement of any amplitude of the height adjustment system.

By virtue of this particular design concept, the displacements of the elements for guiding the top frame do not modify the characteristics of the resilient suspension means when the height adjustment of the seat is modified since the two ends of said resilient means undergo equipollent displacements. Moreover, when the flexibility of the suspension is modified, the height adjustment is in no way affected since the flexibility adjustment means are applied against the height adjustment elements.

A more complete understanding of the invention will be gained from the following description and from the accompanying drawings which show by way of example two embodiments of the invention as applied to a device in which the means for guiding the vertical displacements of the top seat-frame consist of scissors levers.

In these drawings:

FIG. 4 illustrates an alternative form of the height adjustment system of FIG. 1;

FIG. 5 is a corresponding plan view;

FIG. 6 is a view to a larger scale showing the main portion of the height adjustment system of FIG. 4.

Figure 1:
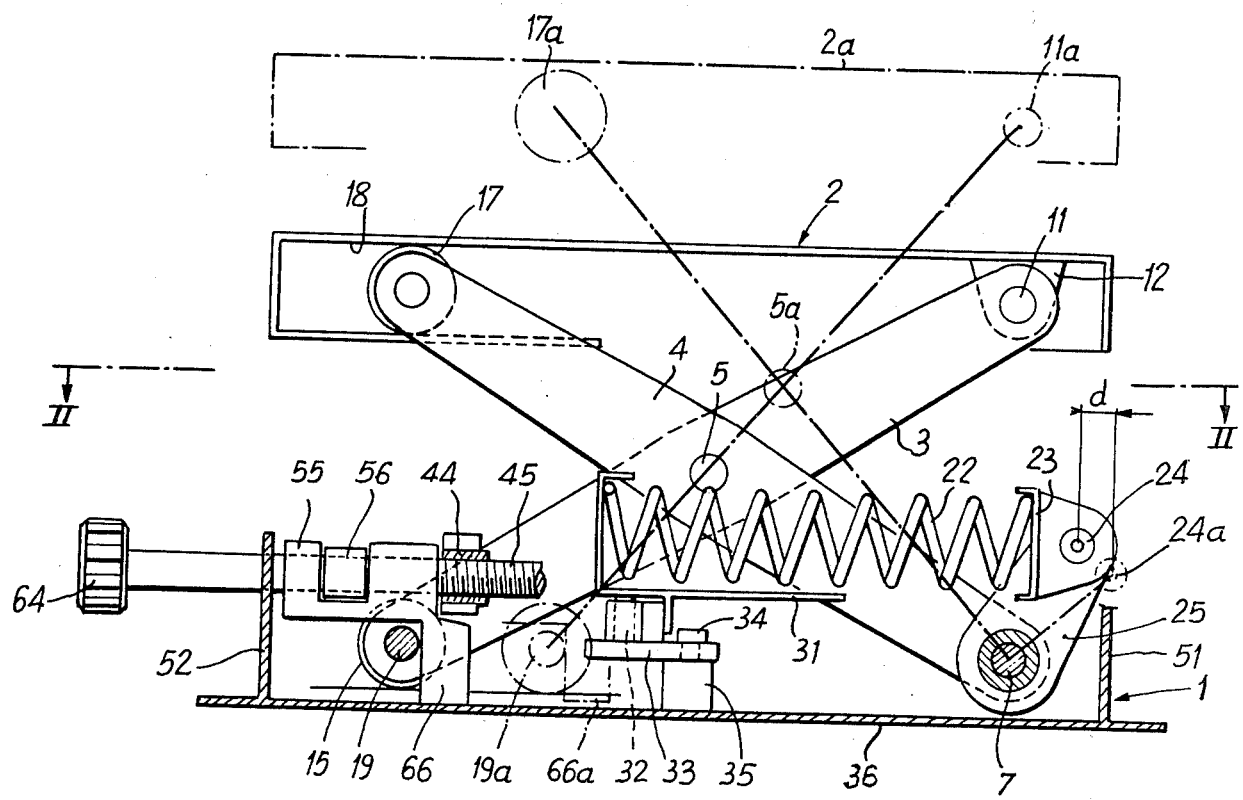
FIG. 1 is a profile view of a first embodiment, this view being taken in vertical cross-section along line I—I of FIG. 2.
Figure 2:
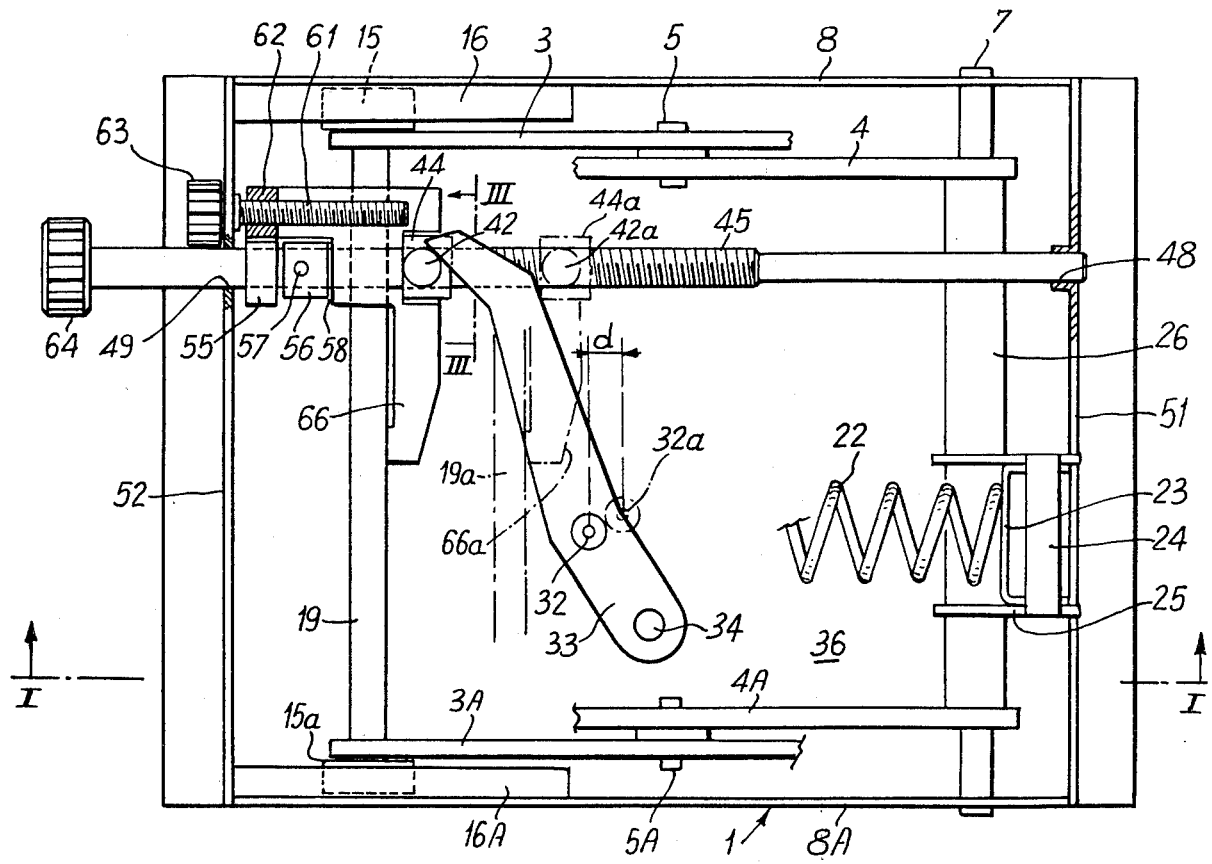
FIG. 2 is a corresponding plan view taken along line II—II of FIG. 1.

The device as shown in FIGS. 1 and 2 for the resilient suspension of a vehicle seat essentially comprises a bottom frame 1 to be mounted on the vehicle, a top frame 2 which is intended to receive the seat (not shown) and means for guiding the vertical displacements of the top frame with respect to the bottom frame. In the example shown, said guiding means are constituted by two pairs of scissors-type levers 3, 4 and 3A, 4A which are all of the same length and are pivotally attached at their midpoints by means of two coaxial pivots 5, 5A. The lower ends of the levers 4 and 4A are pivotally mounted on a horizontal cross-pin 7 which is supported at both ends respectively in two cheeks 8, 8A of the bottom frame 1. Similarly, the upper ends of the other two levers 3, 3A are pivotally mounted on a horizontal pin 11 supported at both ends respectively in two brackets such as the bracket 12 (FIG. 1) which are attached to the underface of the top frame 2. The lower ends of the two levers 3, 3A are adapted to carry rollers 15, 15A which run respectively in two horizontal longitudinal guides 16, 16A having cross-sections in the shape of a "U" laid flat on one side in oppositely-facing relation. Similarly, the upper ends of the two levers 4, 4A are adapted to carry rollers such as the roller 17 (shown in FIG. 1) which run respectively in two similar guides 18, 18A, said guides being rigidly fixed to the top frame 2.

The top frame 2 is continuously urged in the upward direction by a spring consisting of a compression spring 22 in this example, one end of which is applied against a cup 23, said cup being pivotally mounted on the crank-pin 24 of a double crank-arm 25 which is fixed on a tube 26 fitted over the cross-pin 7 and the two ends of which are welded respectively to the lower ends of the levers 4, 4A. The crank-arm 25 is directed upwards at right angles to the direction of the levers 4, 4A.

Figure 3:
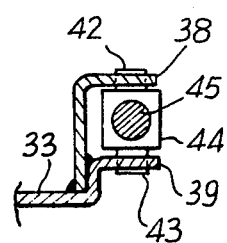
FIG. 3 is a detail sectional view taken along line III—III of FIG. 2.

The other end of the spring 22 is applied against a support bracket 31 which is mounted for pivotal motion about a vertical pin 32 on an intermediate point of an adjusting reduction-lever 33, said lever being in turn pivotally mounted by means of a vertical pin 34 on a block 35 fixed on a base plate 36 of the bottom frame 1. The free end of the lever 33 is designed in the shape of a fork having two arms 38, 39 (as shown in FIG. 3) which are applied against two vertical coaxial lugs 42, 43 of an internally threaded nut 44, said nut being engaged on a horizontal screw 45 having a longitudinal direction and constituting the flexibility adjustment member. The ends of the body of said screw are capable of rotational and longitudinal sliding motion within two bearings 48, 49 formed in two vertical transverse walls, namely the rear wall 51 and front wall 52 respectively of the bottom frame 1. A smooth portion of the body of the screw 45 aforesaid is capable of rotating within a carriage 55 but is secured against longitudinal motion with respect to this latter by means of a ring 56, said ring being fixed on the body of the screw by means of a dowel-pin 57 and imprisoned within a recess 58 of said carriage. Said carriage is capable of longitudinal sliding motion under the action of another longitudinal horizontal screw 61 which constitutes the height adjustment member and is engaged within an internally-threaded lug 62 of the carriage. The screw 61 aforesaid is capable of rotating freely within a hole of the front transverse wall 52 of the bottom frame and is positioned in the axial direction with respect to this latter. Said screw is adapted to carry a knob 63 for adjusting the height of the seat or in other words the vertical location of the useful travel of the suspension whilst the screw 45 carries a knob 64 for adjusting the flexibility of the suspension. The carriage 55 is provided with a projecting arm 66 which is capable of sliding on the base plate 36 of the bottom frame and against which is applied the coupling shaft 19 between the two bottom rollers 15, 15A, under the action of the suspension spring 22. The projecting arm 66 constitutes a stop for determining the top level of the useful travel of the suspension.

The operation of the device is as follows:

It will first be assumed that the system is adjusted on the one hand for the lowest position of the seat or in other words that the carriage 55 has been brought to its end position on the left-hand side as shown in the drawings by rotating the knob 63 and on the other hand for providing maximum flexibility (for a driver of minimum weight) as a result of a minimum value of initial tension of the spring 12 obtained by rotating the knob 64 and moving the nut 44 also to the left-hand end position shown in which the spring-supporting bracket 31 carried by the lever 33 also takes up its end position on the left.

Starting from this position, and if the flexibility adjustment knob 64 alone is rotated in the direction which causes a displacement of the nut 44 towards the right in the drawing (which in any case corresponds to a rearward displacement with respect to the driver who is seated on the vehicle seat) the adjusting lever 33 is displaced in pivotal motion in the clockwise direction. In consequence, the bracket 31 for supporting the left end of the spring also undergoes a displacement towards the right whilst the right end of said spring does not undergo any displacement since it is applied against the cup 23 carried by the crank-arm 25 which is coupled to the scissors levers 4, 4A and said levers have remained stationary by reason of the fact that the carriage 55 has been maintained in the position shown by the height adjustment screw 61. In other words, a change of adjustment of the initial tension of the spring in order to adapt the flexibility of the suspension to the weight of the driver does not produce any modification in the height adjustment of the seat.

It is known that, in a system of this type, if friction forces are not taken into account, equilibrium is obtained when the ratio of the suspended weight to the reaction of the spring is equal to the mechanical advantage ratio of the crank-arm 25 to the lever 4 irrespective of the angle of inclination of the levers on condition that the crank-arm is perpendicular to the lever and that the reaction of the spring can be considered as remaining horizontal. The characteristics of the suspension in respect of a given geometry are accordingly dependent solely on the initial tension of the spring and on its stiffness. The position shown corresponds to the lowest position of the seat in view of the fact that the reaction of the spring tends to cause a pivotal displacement of the levers 4, 4A in the clockwise direction and consequently to cause an upward displacement of the top frame 2 whilst the rollers 15 and 17 move towards the right within their respective guides 16 and 18. The top suspension stop is constituted by the projecting arm 66 of the carriage 55 against which the shaft 19 of the bottom rollers 15, 15A is brought to bear. The top end position of the top seat frame 2 is therefore solely dependent on the position of the carriage 55 and remains unmodified when it modifies the adjustment of the initial tension of the spring.

It will now be assumed that the conditions are again the same as those mentioned at the outset and that the height adjustment knob 63 alone is rotated in the direction which produces a displacement of the carriage 55 to the right by means of the screw 61. Thus the projecting arm 66 of said carriage takes up, for example, the position shown in chain-dotted lines at 66a and permits a displacement of the shaft 19 to the right and to the same extent, with the result that said shaft takes up the position shown in chain-dotted lines at 19a. In this position, the top frame 2 is capable of further upward displacement to a position which can correspond, for example to the maximum height shown in chain-dotted lines at 2a. During these movements, the levers 4, 4A and the crank-arm 25 have carried out a movement of pivotal displacement in the clockwise direction. In consequence, the crank-pin 24 of the crank-arm now occupies the position 24a whilst the displacement of the carriage 55 towards the right has produced a corresponding displacement of the screw 45 and of the nut 44 carried by said screw to the position shown at 44A. Thus the lever 33 has carried out a movement of pivotal displacement towards the right and the pin 32 carrying the bracket 31 which supports the left end of the spring 22 consequently takes up the position shown at 32a. The two ends of the spring are therefore finally displaced towards the right during the operation which is performed for adjusting the height of the seat. In order to prevent any modification of the suspension characteristics during this adjustment operation, it is only necessary to ensure that the initial tension of the spring remains unchanged. In other words, the projections of the displacements of the two ends of the spring (namely of the crank-pin 24 and of the pivot-pin 32) in the mean direction of action of the spring must be two equipollent segments or in other words segments which are equal and have the same direction. Without going into detailed calculations, it is in fact readily apparent that this result can be achieved, for example, by choosing a suitable mechanical advantage or reduction ratio of the adjusting lever 33 or in other words by assuming that the locations of the axis of the nut 44 and of the pivot-pin 32 which carries the spring-supporting bracket are determined by virtue of a suitable choice of the position of the vertical pin 34 on which said adjusting lever is pivoted to the bottom frame 1. A more complete analysis would show, however, that a strict invariance of the suspension characteristics during height adjustment of the seat cannot be obtained in all positions of the nut 44, namely in respect of all values of adjustment of flexibility of the spring by reason of the obliquity of the levers and a number of other restrictive conditions of a constructional nature. Nevertheless, it is shown both by calculation and experience that, by adopting strict compensation in the vicinity of the means for adjusting flexibility and height (which is always possible), the variations in the characteristics of the suspension over the entire range of height adjustment do not exceed a few units percent in extreme cases, which is wholly negligibe in practice.

There is shown in FIGS. 4 to 6 an alternative form of construction which differs from the embodiment of FIGS. 1 to 3 only in the fact that positioning of the carriage 55 of the height adjustment system is no longer carried out by means of a screw 61 but by means of a longitudinal toothed rack 71 fixed on the base plate 36 of the bottom frame 1, the teeth of said rack being inclined upwards and to the rear. The carriage 55 essentially differs from the carriage of the embodiment shown in FIGS. 1 to 3 only in the fact that provision is no longer made for an internally-threaded lug 62 for receiving the screw 61 since this latter no longer exists. On the other hand, provision is made for a vertical recess 72 of rectangular cross-section in which is housed a pawl 73. Said pawl is adapted to cooperate with the teeth of the rack 71 under the action of a helical restoring spring 74. The upper end of said spring is applied against a nose 76 forming a forward projection on the top portion of the vertical rear face of the recess 72. The lower end of said spring is applied against a pawl shoulder 75 which is displaced towards the rear with respect to the tip of the pawl. As will be more clearly brought out in the following description relating to the operation of the device, the pawl 73 is not only capable of vertical sliding motion within the recess 72 but also of pivotal motion about a horizontal transverse axis defined by the straight edge 81 formed by the intersection of the small front vertical face of the recess 72 and the forwardly and downwardly inclined lower portion 82 of said face. Under certain conditions, said pawl can consequently take up the oblique position which is shown in chain-dotted lines at 73A in the right-hand portion of FIG. 6 and in which the hook-shaped top portion 83 of the pawl rests on the nose 76 as shown at 83A since the last tooth 71A of the rack 71 is higher than the others. Finally, the first tooth of the rack 71 is preceded by a heel-shaped projection 85 which is also higher than the ordinary teeth.

Since the other elements of the suspension device as a whole are the same as in the embodiment of FIGS. 1 to 3, the following description will only be concerned with the operation of the height adjustment means. The system as shown in the drawings is adjusted for the lowest position of the seat whilst the pawl 73 is maintained engaged by the spring 74 within the recessed portion of the rack formed between the first tooth of this latter and the heel-shaped projection 85. If the top frame 2 is moved away from this position to a slight extent in the upward direction, for example by exerting an upward effort directly on the seat or on a handle or alternatively on an arm rest rigidly fixed to the seat, the shaft 19 which couples the two bottom rollers 15, 15A together is caused to move backwards and is accompanied in this movement by the carriage 55. In consequence, the pawl 73 slides upwards on the inclined face of the first tooth of the rack 71 in opposition to the force applied by its restoring spring 74 until said pawl falls back into the following rack-tooth throat or root portion. If upward displacement of the seat is then stopped, it is observed that the carriage 55 has moved in the rearward direction with respect to its initial position, namely towards the right in the drawing, over a distance equal to the pitch of the toothed rack, with the result that the mean height position of the seat has moved up to a corresponding extent. Should it be desired to raise this position even further, it would only be necessary to continue the movement just mentioned so as to displace the pawl over one or a number of other teeth of the rack.

It should be observed that, if the movement is continued to the point at which the pawl reaches the last and highest tooth 71A, said pawl then moves upwards to a greater extent and its hook 83 reaches a higher level than that of the top face of the carriage nose 76 (which was not the case when it passed over the ordinary intermediate teeth of the rack). The pawl is then subjected by its restoring spring 74 to a pivotal motion torque about the edge 81 and takes up the oblique position shown at 83A. In other words, the pawl is now engaged in the top position and no longer prevents a displacement of the carriage 55 and of the shaft 19 towards the left as shown in the drawing or in other words in the forward direction when the seat is allowed to return downwards. Thus, when the highest point of adjustment has been exceeded, the device is automatically conditioned for the lowest position. From the moment when the carriage 55 reaches the lowest position of adjustment or in other words the position shown in full lines in the drawings, the tip of the pawl 73 (which has remained engaged on the nose 76 during this forward return movement) comes into contact with the stationary heel-shaped projection 85 of the toothed rack and is thus displaced in pivotal motion in the anticlockwise direction about the edge 81, thus causing disengagement of said pawl from the nose 76. In consequence, the restoring spring 74 again engages the pawl tip in the bottom of the first rack-tooth throat corresponding to the lowest position of the seat. In other words, height adjustment of the seat is always carried out in the upward direction by lifting the seat by hand in a movement having an amplitude corresponding to the height to which the seat is to be raised. If the maximum height is exceeded, the seat automatically returns to the bottom position. This system is particularly advantageous since it does not call for any control device. Thus the user can actuate the system by means of a simple movement which is performed instinctively by hand and consists in directly lifting a seat which he considers to be too low for his own requirements.

As will readily be understood, the invention is not limited to the embodiments which have been described with reference to the accompanying drawings and have been given solely by way of example. Depending on the applications contemplated, any number of modifications can accordingly be made without thereby departing either from the scope or the spirit of the invention.

From this it accordingly follows, for example, that the compression spring employed for the suspension could be replaced by an extension spring by suitably orienting the different lever arms or that the means for guiding, displacement and locking of the adjustment carriage 55 could be other than those described in the foregoing.

What is claimed is:

1. A device for the resilient suspension of a vehicle seat, comprising a bottom frame to be mounted on the vehicle, a top frame on which the seat is to be mounted, means for guiding the vertical displacements of the top frame with respect to the bottom frame, said guiding means being constituted by levers of the scissors type pivotally attached at one end respectively to the bottom frame and to the top frame whilst the other ends of said levers are caused to slide respectively in horizontal guides of said frames, resilient means applied against the bottom frame and attached to the top frame in order to urge said top frame in the upward direction, means for adjusting the flexibility of the resilient means according to the weight of the user, and height adjustment means for vertical location of the useful travel of the suspension according to the height of the user, wherein the means for adjusting the flexibility of the resilient means and the height adjustment means are constituted by two horizontal systems associated mechanically in series, the height adjustment means being applied against the bottom frame whilst the flexibility adjustment means are applied against the height adjustment means, one end of the resilient means being applied against an adjusting reduction-lever which is subjected to the flexibility adjustment means whilst the other end of said resilient means is applied against the crank-pin of a crank-arm, said crank-arm being coupled to the lower ends of the guiding arms which are pivotally mounted on the bottom frame, the height adjustment means being also adapted to actuate a stop for determining the top level of the useful travel of the suspension in cooperation with the lower ends of the guiding levers which are slidably mounted on the bottom frame, the length of the crank-arm as well as the mechanical advantage of the adjusting reduction-lever being such that the two ends of the resilient means undergo a displacement in the same direction and to the same extent in respect of a movement of any amplitude of said height adjustment system.

2. A device according to claim 1, wherein the height adjustment means comprise a longitudinal screw mounted for rotation without axial displacement in the bottom frame and engaged within a nut rigidly fixed to a carriage which is mounted for longitudinal sliding motion on said bottom frame.

3. A device according to claim 1, wherein the height adjustment means comprise a toothed rack rigidly fixed to the bottom frame, a pawl adapted to cooperate with said toothed rack, and a pawl-supporting carriage mounted for longitudinal sliding motion on said bottom frame.

4. A device according to claim 2 or claim 3, wherein the stop for determining the top level of the useful travel of the suspension is rigidly fixed to said carriage and adapted to cooperate with the corresponding guiding levers by means of a shaft which connects the corresponding ends of said guiding levers and carries rollers which run on corresponding guides.

5. A device according to claim 2 or claim 3, wherein the flexibility adjustment means comprise a longitudinal screw having smooth ends which are capable of displacement in pivotal motion and axial sliding motion within the bottom frame, said screw being coupled axially to the carriage aforesaid whilst a nut which is engaged on said screw but is not capable of rotational motion serves as a bearing point for one end of the adjusting reduction-lever which is pivotally mounted on a vertical pin carried by the bottom frame.

6. A device according to claim 3, wherein said device comprises a spring for returning the pawl aforesaid against the upwardly and rearwardly inclined teeth of the rack, means for lifting the pawl to a higher level than that of the crests of the rack teeth when said pawl reaches the rear end of said toothed rack, means whereby the pawl is then locked in its top position and means whereby said pawl is released and allowed to return downwards against the toothed rack when it is returned to the front end of said rack.

7. A device according to claim 6, wherein the means for lifting the pawl are constituted by an additional height of the last tooth of the rack, wherein the means for locking the pawl in the top position comprise a hook forming part of said pawl and adapted to cooperate in the top pawl position aforesaid with a nose which projects inwards from the rear wall of a vertical recess of rectangular cross-section in which the pawl is slidably mounted, the pawl-restoring spring being applied at one end beneath said nose and at the other end against a pawl shoulder which is rearwardly displaced with respect to the tip of the pawl in order to subject said pawl to a pivotal motion torque about the horizontal transverse edge constituted by the intersection of the front face of said recess and the forwardly and downwardly inclined lower portion of said face, and wherein the means for releasing the pawl are constituted by a heel-shaped projection which precedes the first tooth of the rack and is higher than said first tooth.

* * * * *